United States Patent
Berry et al.

(10) Patent No.: US 11,387,757 B2
(45) Date of Patent: Jul. 12, 2022

(54) INDUCTANCE-BASED ESTIMATION OF ROTOR MAGNET TEMPERATURE

(71) Applicants: GM GLOBAL TECHNOLOGY OPERATIONS LLC, Detroit, MI (US); Seoul National University R & DB Foundation, Seoul (KR)

(72) Inventors: Daniel J. Berry, Macomb Township, MI (US); Anno Yoo, Rochester, MI (US); Seung Ki Sul, Seoul (KR); Hyun-Sam Jung, Seoul (KR)

(73) Assignees: GM Global Technology Operations LLC, Detroit, MI (US); Seoul National University R & DB Foundation, Seoul (KR)

( * ) Notice: Subject to any disclaimer, the term of this patent is extended or adjusted under 35 U.S.C. 154(b) by 496 days.

(21) Appl. No.: 16/559,742

(22) Filed: Sep. 4, 2019

(65) Prior Publication Data

US 2021/0067075 A1 Mar. 4, 2021

(51) Int. Cl.
*H02P 21/16* (2016.01)
*H02P 21/00* (2016.01)
(Continued)

(52) U.S. Cl.
CPC ............ *H02P 21/16* (2016.02); *B60L 3/0061* (2013.01); *B60L 15/20* (2013.01);
(Continued)

(58) Field of Classification Search
CPC .......... H02P 21/16; H02P 21/18; H02P 21/22; H02P 21/0025; H02P 2203/11; B60L 3/0061; B60L 15/20
See application file for complete search history.

(56) References Cited

U.S. PATENT DOCUMENTS

| 4,926,105 A | 5/1990 | Mischenko et al. |
| 9,438,145 B2 | 9/2016 | Reigosa et al. |

(Continued)

FOREIGN PATENT DOCUMENTS

| CN | 109428525 A | * | 3/2019 | .............. H02P 21/00 |
| JP | 2003235286 A | * | 8/2003 | .......... H02P 29/0066 |

(Continued)

OTHER PUBLICATIONS

H.S. Jung et al.; "Non-Invasive Magnet Temperature Estimation of IPMSM Based on High-Frequency Inductance With a Pulsating High-Frequency Voltage Signal Injection"; IEEE Transactions on Industry Applications, vol. 55, No. 3, May/Jun. 2019.

(Continued)

*Primary Examiner* — Kawing Chan
(74) *Attorney, Agent, or Firm* — Quinn IP Law (57) ABSTRACT

A method for estimating a magnet temperature of a rotor magnet within a rotary electric machine includes, while a rotor of the electric machine is stationary, injecting a high-frequency voltage component onto a control voltage of the electric machine, via a controller, to generate an adjusted voltage command, and extracting a high-frequency component of a resulting current as an extracted high-frequency component. The method also includes calculating an inductance value of the electric machine using the extracted high-frequency component of the resulting current. The magnet temperature is estimated using the calculated inductance value and an angular position of the rotor. The method includes controlling an operation of the electric machine using the estimated magnet temperature. An electric powertrain uses the electric machine and controller noted above.

20 Claims, 3 Drawing Sheets

(51) Int. Cl.
*H02P 21/18* (2016.01)
*H02P 21/22* (2016.01)
*B60L 15/20* (2006.01)
*B60L 3/00* (2019.01)

(52) U.S. Cl.
CPC .......... *H02P 21/0025* (2013.01); *H02P 21/18* (2016.02); *H02P 21/22* (2016.02); *H02P 2203/11* (2013.01)

(56) References Cited

U.S. PATENT DOCUMENTS

| | | |
|---|---|---|
| 10,072,993 B2 | 9/2018 | Reigosa et al. |
| 2008/0303475 A1 | 12/2008 | Patel et al. |
| 2015/0222216 A1* | 8/2015 | Ogawa .................... B60L 3/12 318/490 |
| 2015/0381091 A1* | 12/2015 | Henderson .............. H02P 21/13 318/400.33 |
| 2016/0352275 A1 | 12/2016 | Senoo |
| 2017/0155353 A1 | 6/2017 | Lee |

FOREIGN PATENT DOCUMENTS

| | | | |
|---|---|---|---|
| JP | 2014007851 A | * | 1/2014 |
| JP | 6179389 B2 | | 8/2017 |

OTHER PUBLICATIONS

H.S. Jung et al.; "Non-Invasive Magnet Temperature Estimation in IPMSM by High Frequency Pulsating Sinusoidal Voltage Signal Injection"; IEEE Transp. Electrific. Conf. Expo., Long Beach, CA, USA, 2018, pp. 858-862.

\* cited by examiner

INDUCTANCE-BASED ESTIMATION OF ROTOR MAGNET TEMPERATURE

INTRODUCTION

The present disclosure relates to methods and systems for estimating the temperature of a permanent magnet of the type used on or within a rotor of an electric machine. For instance, the rotor of a permanent magnet-type ("PM") synchronous machine may include a set of surface-mounted or lamination-embedded permanent magnets ("rotor magnets"). The rotor may be positioned concentrically with respect to a stator, with the stator having a set of radially-projecting stator teeth. Gaps between adjacent stator teeth are wound with lengths of conductive wire to form stator windings. A rotating magnetic field is generated when the stator windings are energized by a polyphase power supply. This rotating stator field then interacts with the magnetic field of the rotor magnets to impart rotation to the rotor. Resulting motor torque on the rotor may be harnessed and thereafter used to perform work in a variety of mobile and stationary systems.

Motor control circuits typically utilize proportional-integral ("PI") control logic to regulate operation of a rotary electric machine. In a polyphase/alternating current ("AC") electric machine, for instance, a PI controller may implement a feedback loop to adjust separate direct-axis ("d-axis") and quadrature-axis ("q-axis") current and voltage commands to thereby produce a desired amount of torque at a given machine speed. The d-axis coincides with the radial plane of symmetry of the machine's poles, and thus the d-axis commands are used to produce a particular magnetic effect along each field pole axis. The q-axis, which is perpendicular to the d-axis and therefore coincides with the radial plane midway between adjacent field poles, is likewise used as a command to produce the desired rotation.

In addition to control of the d-axis and q-axis currents, machine temperature is another important control variable when regulating operation of a rotary electric machine. Accurate knowledge of the machine temperature is also needed for accurate diagnostics. Existing methodologies for estimating magnet temperature tend to depend on complex thermal models. Such thermal models are, in turn, largely dependent upon reliable information about the motor's cooling system, e.g., coolant temperature and flow rate, and may be susceptible to signal errors in the various required input signals. Likewise, temperature estimation approaches that rely on knowledge of machine resistance tend to be subverted by core, eddy current, and other prevalent loss effects, all of which are difficult to decouple from temperature effects.

SUMMARY

A method is disclosed herein for estimating a magnet temperature of a rotor magnet within a rotary electric machine at zero speed, i.e., when a rotor of the electric machine is not stationary. The disclosed method relies on motor control signals already available in a typical motor control loop, and thus functions without resorting to the above-noted thermal models. Instead, the method relies upon a characterized temperature-inductance-position relationship to estimate the magnet temperature in real-time when the rotor is not rotating. In executing the disclosed method, a motor controller uses d-axis and q-axis control voltage commands, rotor position, and the noted relationship to estimate the magnet temperature. The estimated magnet temperature is thereafter used to control dynamic operation of the electric machine and/or to help regulate the machine's operating temperature.

Specifically, the controller described herein injects a high-frequency voltage component onto a control voltage ordinarily used for machine control purposes, i.e., d-axis and q-axis commands to the stator. The controller extracts a high-frequency component of a resulting electrical current and thereafter uses this extracted component to calculate an inductance value of the electric machine. Additionally, the controller uses the calculated inductance value to estimate the magnet temperature, e.g., using a three-factor lookup table.

An exemplary embodiment of a method for estimating the magnet temperature of a rotor magnet includes, while the rotor is stationary, measuring an angular position of the rotor using a position sensor and injecting a high-frequency voltage component onto a control voltage of the electric machine, via a controller, to thereby generate an adjusted voltage command. The method also includes extracting a high-frequency component of a resulting current as an extracted high-frequency component and calculating an inductance value of the electric machine using the extracted high-frequency component of the resulting current, then estimating a temperature of the rotor magnet using the calculated inductance value and the angular position to thereby generate an estimated magnet temperature. When the rotor is no longer stationary, an operation of the electric machine is controlled using the estimated magnet temperature.

Extracting the high-frequency component of the resulting current may include using a band pass filter.

When the position sensor is embodied as a resolver, the method may optionally include executing an offset learning process of the resolver via the controller when the rotor is stationary.

Some embodiments of the method include receiving a torque command for the electric machine via the controller, converting the torque command into d-axis and q-axis current commands via the controller, and converting the d-axis and q-axis current commands into d-axis and q-axis voltage commands prior to injecting the high-frequency voltage component, wherein the d-axis and q-axis voltage commands form the control voltage.

The high-frequency voltage component has a calibrated amplitude and a calibrated frequency, and is a square wave or a sinusoidal wave. For instance, the calibrated amplitude and frequency may be in the range of 20V to 50V and 500 Hz to 2 kHz, respectively, in an exemplary embodiment.

The electric machine may be connected to a power inverter module ("PIM") having a switching frequency. The calibrated frequency of the high-frequency voltage component in this embodiment may be less than half of the switching frequency of the PIM.

The electric machine may be connected to a load, with the operation of the electric machine including delivering motor torque to the load via the rotor. The operation of the electric machine may alternatively or also include diagnosing a condition of the electric machine and/or regulating a temperature of the electric machine.

The load may be a road wheel of a motor vehicle.

An electric powertrain is also disclosed herein that, in an exemplary embodiment, includes a rotary electric machine connected to a PIM and having a rotor with a plurality of rotor magnets. The powertrain also includes a load coupled to the rotary electric machine, a position sensor configured to measure an angular position of the rotor, and a controller in communication with the PIM and the rotary electric machine.

The controller is configured, when the rotor is stationary, to inject a high-frequency voltage component onto a control voltage of the electric machine to thereby generate an adjusted voltage command, to extract a high-frequency component of a resulting current as an extracted high-frequency component, and to calculate an inductance value of the electric machine using the extracted high-frequency component of the resulting current. The controller is also configured to estimate a temperature of the rotor magnets using the calculated inductance value and the angular position to thereby generate an estimated magnet temperature. When the rotor is no longer stationary, the controller controls an operation of the electric machine using the estimated magnet temperature.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 1:
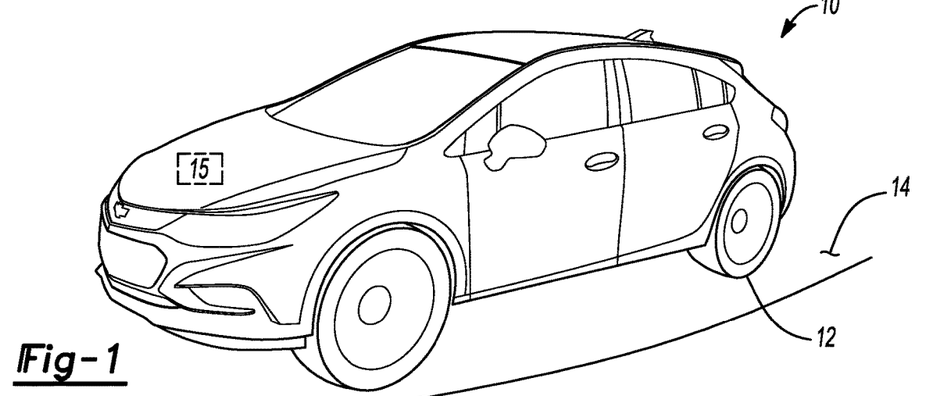
FIG. 1 is a schematic illustration of an exemplary vehicle having an electric powertrain, with the powertrain including a rotary electric machine and a controller configured to estimate a rotor magnet temperature in accordance with the present disclosure.

Referring to the drawings, wherein like reference numbers refer to the same or like components in the several Figures, a vehicle 10 having an electric powertrain 15 is depicted schematically in FIG. 1. The vehicle 10 may be variously embodied as a motor vehicle, robot, or other rolling platform having road wheels 12 in rolling contact with a road surface 14. Alternatively, the electric powertrain 15 may be used in stationary applications, e.g., as part of a power plant or hoisting system. For illustrative consistency, the vehicle 10 will be described hereinafter as a representative host system for the electric powertrain 15 without limiting the present teachings to vehicular or mobile applications.

Figure 2:
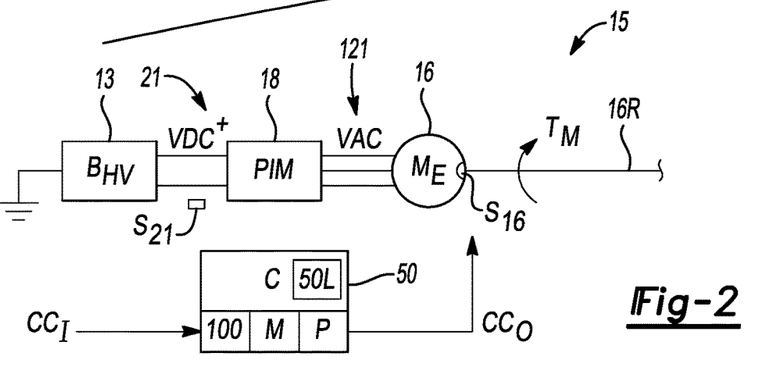
FIG. 2 is a schematic illustration of an embodiment of the electric powertrain usable as part of the vehicle shown in FIG. 1.

The electric powertrain 15 is shown in further detail in FIG. 2 as having a high-voltage battery ("$B_{HV}$") 13, a power inverter module ("PIM") 18, and a rotary electric machine ("$M_E$") 16. The electric machine 16 includes a plurality of permanent magnets 17 (see FIGS. 3A and 3B) whose temperature is estimated in real-time using a controller ("C") 50 according to a method 100. The controller 50 is configured to receive input signals (arrow $CC_I$), execute instructions embodying the method 100 using control logic 50L in response to the input signals (arrow $CC_I$), and transmit output signals (arrow $CC_O$) based on the results of the method 100.

Figure 4:
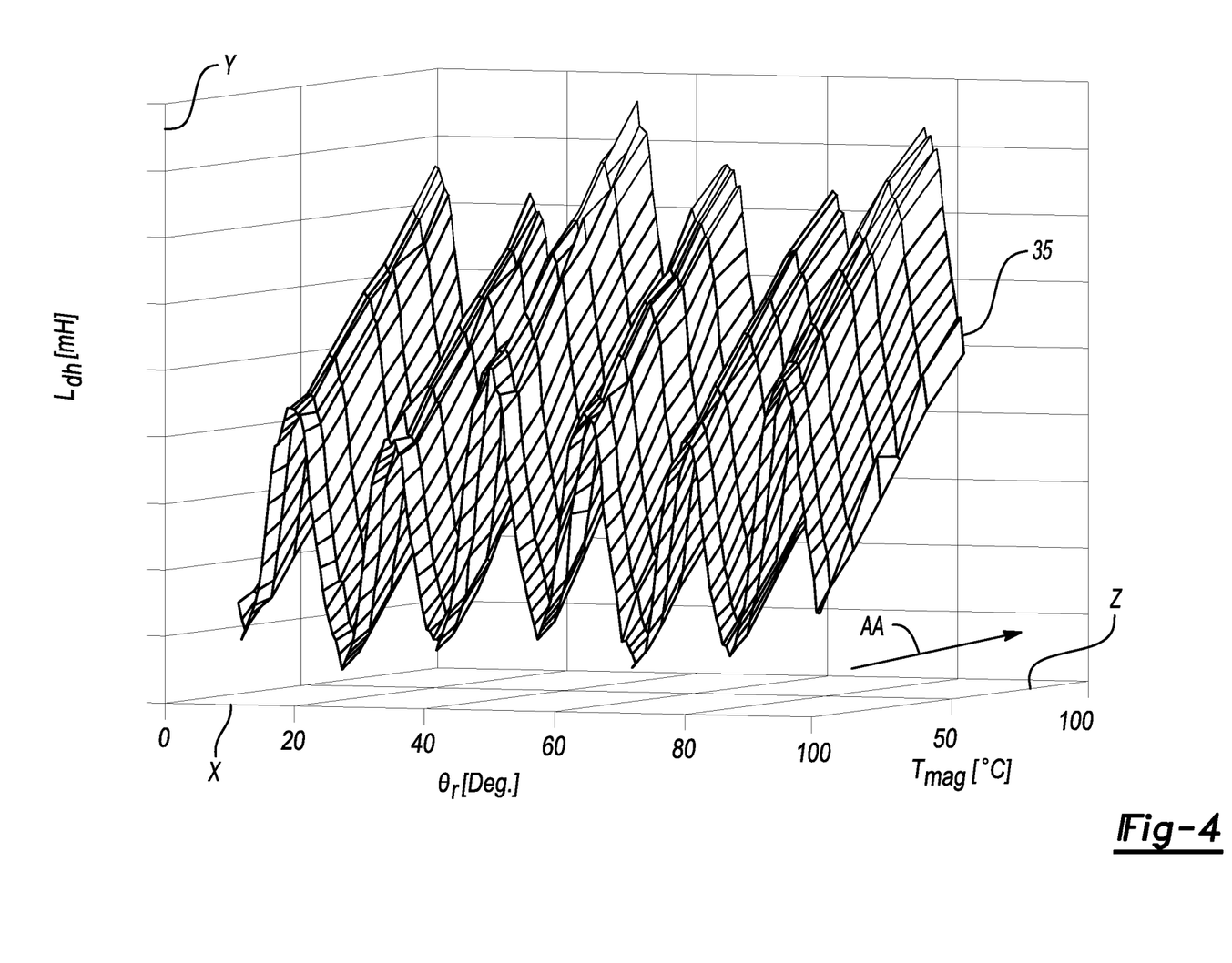
FIG. 4 is a three-axis plot of inductance, temperature, and rotor position depicting an inductance trend that is relied upon in executing the present method.

As described below with reference to FIGS. 4 and 5, the control logic 50L, among other possible functions related to operational control of the electric machine 16, enables the real-time estimation of magnet temperature based on high-frequency inductance of the electric machine 16. By characterizing a high-frequency inductance relationship, e.g., as shown in FIG. 4, and by measuring or otherwise determining a rotor position (arrow $\theta_r$) of the electric machine 16 from a position sensor $S_{16}$, the controller 50 is able to estimate magnet temperature, and to thereafter use the estimated magnet temperature to control and diagnose the electric machine 16.

In the exemplary embodiment of the electric powertrain 15 as illustrated in FIG. 2, the battery pack 13 is connected to a DC-side of the PIM 18 via positive ("+") and negative ("−") rails of a DC voltage bus ("VDC") 21. An AC-side of the PIM 18 is connected to individual electrical phase leads of the electric machine 16 via an AC voltage bus ("VAC") 121. As will be appreciated, the on/off states of multiple semiconductor switches (not shown) within the PIM 18 are controlled, e.g., via pulse-width modulation techniques, to generate a particular output voltage. Operation of the PIM 18 is bi-directional, and thus an AC voltage may be rectified to form a DC voltage, or the DC voltage converted to form the AC voltage, with the particular power conversion direction depending on the current operating mode.

When the electric machine 16 is energized as a traction motor via operation of the PIM 18, motor output torque (arrow $T_M$) is generated on a rotor 16R of the electric machine 16, with the rotor 16R in turn being coupled to a load. In the exemplary vehicle 10 of FIG. 1, for instance, the load may be one or more of the depicted road wheels 12, such that the electric powertrain 15 functions as a drivetrain, e.g., of a hybrid electric or a battery electric embodiment of the vehicle 10.

The controller 50 of FIG. 2 may be embodied as one or more digital computing devices, and may include one or more processors (P) or cores and sufficient amounts of tangible non-transitory memory (M), including read only memory in the form of optical, magnetic, or flash memory. The controller 50 may further include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry. As part of the method 100 as well as in executing other possible control functions related to operation of the electric machine 16, the controller 50 receives the input signals (arrow $CC_I$), including the rotor position (arrow $\theta_r$) and other signals such as motor speed (arrow $N_m$) and the DC bus voltage (VDC) as set forth below with reference to FIG. 5. The controller 50 is therefore in communication with a position sensor $S_{16}$, and a voltage sensor $S_{21}$, which respectively provide the rotor position (arrow $\theta_r$) and DC bus voltage (VDC) to the controller 50. In response to receipt of the input signals (arrow $CC_I$) and execution of the method 100, the controller 50 transmits the output signals (arrow $CC_O$) to the electric powertrain 15 or components thereof based on the estimated magnet temperature.

Figure 3A:
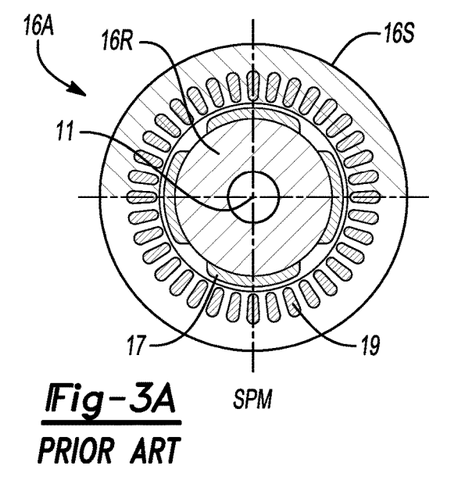
FIGS. 3A and 3B are prior art depictions of alternative surface-mounted and embedded rotor magnet configurations of the electric machine shown schematically in FIG. 2.
Figure 3B:
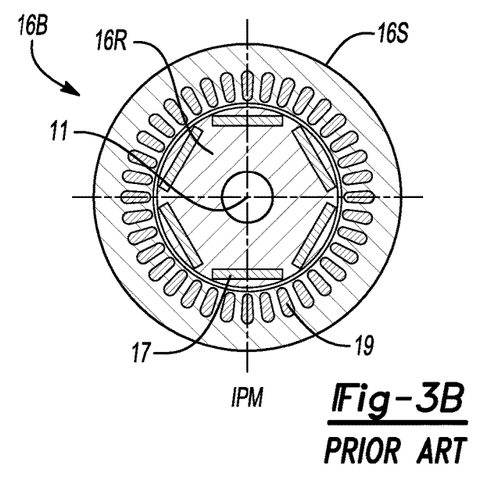

Referring briefly to FIGS. 3A and 3B, the rotary electric machine 16 of FIG. 2 may be alternatively embodied as a permanent magnet ("PM")-type synchronous device in which permanent magnets 17 are mounted to a surface of the rotor 16R, as shown in the surface permanent magnet ("SPM") embodiment of the electric machine 16A of FIG. 3A. Alternatively, the permanent magnets 17 may be embedded within laminations of the rotor 16R as shown in the electric machine 16B of FIG. 3B, i.e., as an interior permanent magnet ("IPM") machine. For instance, an interior permanent magnet synchronous machine ("IPSM") is often used as a traction motor in vehicular application due to its torque density and operating speed range advantages, which are brought about in large part due to the flux-weakening capabilities of the IPSM configuration. A stator 16S surrounds the rotor 16R in the illustrated configuration of FIGS. 3A and 3B. However, in other embodiments the rotor 16R may surround the stator 16S.

When individual stator windings 19 are energized via operation of the PIM 18 shown in FIG. 1, a rotating stator magnetic field ensues, with the rotating stator field interacting with the magnetic field of the permanent magnets 17. Mutual field interaction ultimately imparts rotation to the rotor 16 about a center axis 11 of the rotor 16R, with such rotation generating the motor output torque (arrow $T_M$) shown in FIG. 2. FIGS. 3A and 3B illustrate two possible configurations of the electric machine 16 and permanent magnets 17. However, the present teachings are not limited to a particular configuration of the electric machine 16 of FIG. 2, and therefore FIGS. 3A and 3B are merely exemplary of two common locations of the permanent magnets 17 with respect to the rotor 16R.

FIG. 4 is a three-axis plot 35 of machine inductance ($L_{dh}$), rotor position ($\theta_r$), and magnet temperature ($T_{mag}$). Inductance ($L_{dh}$) is depicted on the Y-axis and represented in milli-Henries (mH). Rotor position ($O_r$) is depicted on the X-axis and represented in degrees (Deg.). Magnet temperature ($T_{mag}$) is depicted on the Z-axis and represented in degrees Celsius (° C.). As a basis for the present method 100, a high-frequency inductance component of the electric machine 16 is pre-associated with the present magnet temperature. This relationship may be recorded in memory (M) of the controller 50 of FIG. 2, e.g., as a lookup table. By characterizing the unique inductance-temperature-position relationship of the three-axis plot 35, e.g., in a corresponding accessible lookup table, the controller 50 is able to rapidly estimate the magnet temperature.

Methodologies attempting to relate resistance to magnet temperature are rendered suboptimal by certain losses, including core and eddy current losses occurring within the stator 16S and rotor 16R shown in FIGS. 3A and 3B. Such loss effects are difficult to decouple from temperature effects, and thus a clear resistance-temperature trend may be difficult to accurately discern. It is recognized herein as a basis for the present method 100 that inductance is not corrupted by the same loss effects. The controller 50 is therefore configured to use the inductance-temperature-position relationship in estimating the magnet temperature.

Figure 5:
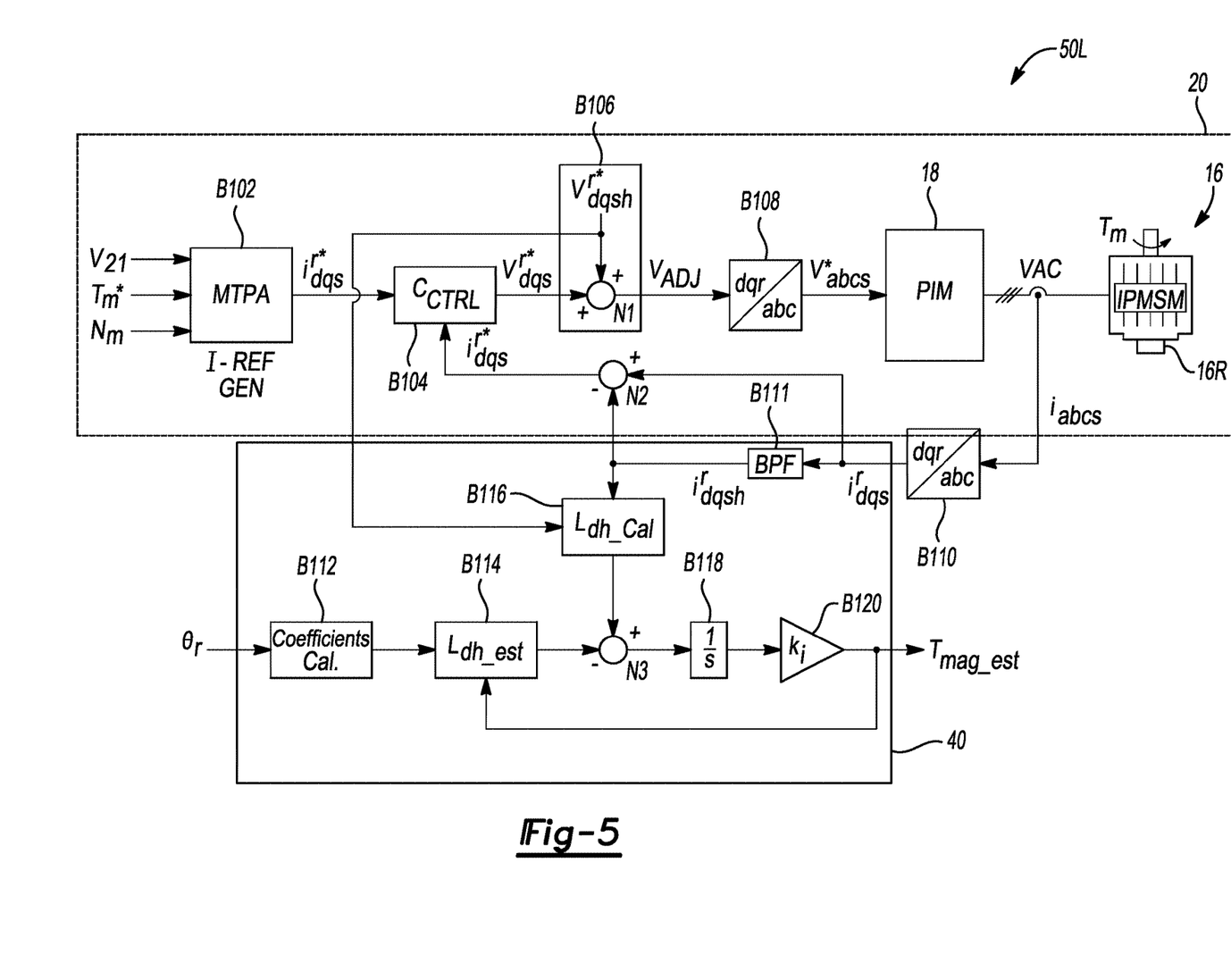
FIG. 5 is a logic flow diagram depicting a logic configuration of the controller shown in FIG. 2.

Referring to FIG. 5, the above-noted control logic 50L is depicted for execution by the controller 50 as part of the method 100. The control logic 50L includes a motor control loop 20 and a temperature estimation loop 40. The constituent logic blocks of the motor control loop 20 describe control functions used to control operation of the electric machine 16. The temperature estimation loop 40 is added to the motor control loop 20 to implement the temperature estimation aspects of the present method 100.

Logic block B102 is a current reference generator ("I-REF GEN") block which receives a motor torque command ($T_m^*$), which is 0 Nm when the rotor 16R of FIG. 2 is stationary. Block B102 also receives, as part of the input signals (arrow $CC_I$), the measured DC bus voltage (arrow VDC) from the voltage sensor $S_{21}$ of FIG. 2, and may receive a motor speed (arrow $N_m$) that is measured or estimated, e.g., by processing the measured angular position of the rotor 16R over a period of time via the controller 50. Block B102 converts the motor torque command ($T_m^*$) for the associated bus voltage and speed information to a corresponding current command ($i_{dqs}^{r*}$). As will be appreciated, a maximum torque per ampere ("MTPA") block may be used to implement block B102, with block B102 corresponding to the underlying functions and/or lookup tables used to make the requisite translation from torque to current. The output of logic block B102 is the corresponding rotating ("r") d-axis and q-axis electrical current commands ($i_{dqs}^{r*}$) used to energize the stator 16S for torque control of the electric machine 16.

Logic block B104 is a current controller ("$C_{CTRL}$") that receives the current commands ($i_{dqs}^{r*}$) from logic block B102 and translates the same to corresponding d-axis and q-axis voltage commands forming the control voltage ($V_{dqs}^{r*}$) to the stator 16S of the electric machine 16. The control voltage ($V_{dqs}^{r*}$) is fed into logic block B106. The current controller of block B104 may be embodied as a proportional-integral ("PI") controller or complex PI controller, as will be appreciated by those of ordinary skill in the art.

At logic block B106, which forms an "injected voltage" control block in the context of method 100, the control voltage from block B104, e.g., a sinusoid or a square wave signal, is combined with a high-frequency voltage component ($V_{dqsh}^{r*}$). As used herein, the term "high-frequency" refers to frequencies of up to half of the pulse-width modulation ("PWM") or other switching frequency of the PIM 18. For instance, when the switching frequency is 10 kHz, the corresponding frequency of the injected high-frequency voltage component ($V_{dqsh}^{r*}$) may be less than 5 kHz, e.g., a 20-50V/500 Hz-2 kHz signal in some embodiments. The output of block B106 is then passed to logic block B108.

At logic block B108, the rotating dq frame of reference output from block B106 may be transformed to a rotating "abc" reference frame of the electric machine 16. Such an embodiment assumes that the electric machine 16 is a three-phase machine having nominal a, b, and c phases. The present teachings, when applied to embodiments having more the three phases, would require an appropriate higher phase implementation of block B108. The transformed voltage ($V_{abcs}^*$) is transmitted to the PIM 18. From the PIM 18, the above-noted AC-side voltage (VAC) is delivered to the individual phase leads of the electric machine 16, with the rotor 16R of the energized electric machine 16 ultimately delivering motor torque (arrow $T_M$) to a coupled load, e.g., the road wheels 12 of FIG. 1.

Still referring to FIG. 5, the phase currents (arrow $i_{abcs}$) at the AC-side of the PIM 18 are fed into logic block B110, which performs another frame transformation, this time in the opposite direction. That is, the "abc" frame of reference of the electric machine 16 is transformed back to the rotating "dq" frame. The transformed currents (arrow $i_{dqs}^r$), which is the current combination from Vas output from block B104 and $V_{dqsh}^{r*}$ as injected at block B106, are fed into a node N2, as well as into a bandpass filter ("BPF") at block B111.

Block B111 filters out the high-frequency component of the transformed currents (arrow $i_{dqs}^r$), i.e., a current component due to the injected voltage resulting above a calibrated cutoff frequency, and feeds the high-frequency current component (arrow $i_{dqsh}^r$) into logic block B120 of the temperature estimation loop 40. At node N2, the high-frequency current component (arrow $i_{dqsh}^r$) is subtracted from the transformed current (arrow $i_{dqs}^r$), and the difference is fed into the current controller, i.e., logic block B104. That is, node N2 eliminates the high-frequency current component resulting from the injected voltage at block B106, such that the output of node N2 is the current into the current controller B104 (also shown from logic block B102).

Within the temperature estimation block 40, logic block B112 receives the measured or reported rotor position ($\theta_r$), e.g., from the position sensor S$_{16}$ of FIG. 2. Block B112 may be pre-populated with coefficients, e.g., A$_{Ldh}$, B$_{Ldh}$, and C$_{Ldh}$, derived offline as calibration factors which relate high-frequency inductance to magnet temperature based on the rotor position ($\theta_r$). FIG. 4 is a depiction of such a relationship. The coefficients are then fed into logic block B114.

At logic block B114, the controller 50 estimates the inductance ("Ldh_est") of the electric machine 16 based on the phase coefficients from block B112. The estimated total inductance of the electric machine 16 is then passed to node N3.

Logic block B116 receives as an input the high-frequency voltage component ($V_{dqsh}^{r*}$) from block B106 and the high-frequency current component (arrow $i_{dqsh}^r$) from block B111. Within block B116, the controller 50 calculates an associated high-frequency inductance component, i.e., "Ldh_Cal". For instance, the controller 50 may solve the following equation:

$$L_{dsh} = -\frac{V_h}{|i_{dsh}^r|\omega_h}\sin\emptyset_d.$$

In this equation, L$_{dsh}$ represents the d-axis high-frequency inductance component obtained from the high-frequency voltage injection at block B106, V$_h$ is the magnitude of the injected voltage, $\omega_h$ is the frequency of injected voltage, $\emptyset_d$ is the angle between the injected voltage and the current, and |$i_{dsh}^r$| is the magnitude of the d-axis current due to the voltage injection at block B106.

The high-frequency inductance component, L$_{dsh}$, is isolated from the total machine inductance at node N3 and fed into an integrator block B118, i.e., $$\frac{1}{s},$$

and amplified via a calibrated gain factor (k$_t$) at block B120 to produce the estimated magnet temperature (T$_{mag\_est}$). A feedback loop may be used in which the estimated magnet temperature is fed back into block B114 to correct for possible error.

As noted above, when performing the present method 100, such as aboard the vehicle 10 of FIG. 1, the controller 50 of FIG. 2 injects a high-frequency voltage component on top of an existing control voltage signal, and then extracts a high-frequency component of the resulting current component. Using the extracted current component, the controller 50 calculates an associated high-frequency inductance component, and thereafter estimates the magnet temperature using the inductance component. Unlike methodologies that require access to complex thermal models of a cooling system used to regulate temperature of the electric machine 16, e.g., based on coolant flow rate and temperature, the present method 100 relies on signals within a logic circuit already used to control operation of the electric machine 16.

The method 100 may include concurrently executing a resolver offset learning process when the rotor 16R remains stationary. That is, the position sensor S$_{16}$ of FIG. 2 may be embodied as a resolver, which as will be appreciated can accumulate errors and thus relies on a resolver offset for accurate calibration. Such an offset learning process may be performed using the high-frequency voltage injection within the motor control block 20 of FIG. 5, at standstill, concurrently with temperature estimation within the temperature estimation block 40. Alternatively, the method 100 may be used at non-zero speeds provided sufficient voltage remains available to inject the high-frequency voltage component ($V_{dqsh}^{r*}$) above the level of a fundamental voltage needed for control of the electric machine 16.

As will be appreciated by one of ordinary skill in the art in view of the foregoing disclosure, the method 100 enables real-time estimation of a magnet temperature within the rotary electric machine 16. In an embodiment of the method 100, while the rotor remains stationary, the high-frequency voltage component ($V_{dqsh}^{r*}$) is injected onto the control voltage ($V_{dqs}^{r*}$) of the electric machine 16, via the controller 50, to generate the adjusted voltage command ($V_{ADJ}$). The high-frequency component of a resulting current ($i_{dqsh}^r$) is then extracted as an extracted high-frequency component.

The method 100 in this embodiment further includes deriving a calculated inductance value (L$_{dh\_Cal}$) of the electric machine 16 using the extracted high-frequency current component ($i_{dqsh}^r$), and estimating a magnet temperature of the rotor magnet 17 of FIG. 3A or 3B, again when the rotor 16R remains stationary, using the calculated inductance value (L$_{dh\_Cal}$) and the measured angular position ($\theta_r$) of the rotor 16R. In this manner the controller 50 is able to generate the estimated magnet temperature (T$_{mag\_est}$).

The controller 50 may thereafter control a dynamic operation of the electric machine 16, regulate temperature of the electric machine 16, and/or perform diagnostics on the electric machine 16. For instance, the controller 50 may use the estimated magnet temperature to regulate torque and/or speed of the electric machine 16, and/or determine when a temperature regulation or limiting operation is required, and thereafter regulate or limit the machine temperature, such as by commanding more or less coolant flow from a motor cooling system (not shown). Elevated temperatures of the electric machine 16 may be indicative of a faulty cooling system or other fault, and therefore the present teachings may also be used for diagnostic purposes.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for estimating a magnet temperature of a rotor magnet within a rotary electric machine having a rotor that includes the rotor magnet, the method comprising:
   while the rotor is stationary:
      measuring an angular position of the rotor using a position sensor;
      injecting a high-frequency voltage component onto a control voltage of the electric machine, via a controller, to thereby generate an adjusted voltage command;
      extracting a high-frequency component of a resulting current as an extracted high-frequency component, wherein the resulting current corresponds to the adjusted voltage command;
      calculating an inductance value of the electric machine using the extracted high-frequency component of the resulting current; and
      estimating a temperature of the rotor magnet using the calculated inductance value and the angular position to thereby generate an estimated magnet temperature; and
   when the rotor is no longer stationary, controlling an operation of the electric machine using the estimated magnet temperature.

2. The method of claim 1, wherein extracting the high-frequency component of the resulting current includes using a band pass filter.

3. The method of claim 1, wherein the position sensor is a resolver, the method further comprising:
   executing an offset learning process of the resolver via the controller when the rotor is stationary.

4. The method of claim 1, the method further comprising:
   receiving a torque command for the electric machine via the controller;
   converting the torque command into d-axis and q-axis current commands via the controller; and
   converting the d-axis and q-axis current commands into d-axis and q-axis voltage commands prior to injecting the high-frequency voltage component, wherein the d-axis and q-axis voltage commands form the control voltage.

5. The method of claim 1, wherein the high-frequency voltage component has a calibrated amplitude and a calibrated frequency, and is a square wave or a sinusoidal wave.

6. The method of claim 5, wherein the calibrated amplitude is in a range of 20V to 50V, and the calibrated frequency is in a range of 500Hz to 2kHz.

7. The method of claim 5, wherein the electric machine is connected to a power inverter module ("PIM") having a switching frequency, and wherein the calibrated frequency of the high-frequency voltage component is less than half of the switching frequency of the PIM.

8. The method of claim 1, wherein the electric machine is connected to a load, and wherein the operation of the electric machine includes delivering motor torque to the load via the rotor.

9. The method of claim 1, wherein the electric machine is connected to a load, and wherein the operation of the electric machine includes diagnosing a condition of the electric machine and/or regulating a temperature of the electric machine.

10. The method of claim 9, wherein the load is a road wheel of a motor vehicle.

11. An electric powertrain comprising:
   a power inverter module ("PIM");
   a rotary electric machine connected to the PIM, and having a rotor with a plurality of rotor magnets;
   a load coupled to the rotary electric machine;
   a position sensor configured to measure an angular position of the rotor; and
   a controller in communication with the PIM and the rotary electric machine, wherein the controller is configured to:
      when the rotor is stationary:
         inject a high-frequency voltage component onto a control voltage of the electric machine to thereby generate an adjusted voltage command;
         extract a high-frequency component of a resulting current as an extracted high-frequency component, wherein the resulting current corresponds to the adjusted voltage command;
         calculate an inductance value of the electric machine using the extracted high-frequency component of the resulting current; and
         estimate a temperature of the rotor magnets using the calculated inductance value and the angular position to thereby generate an estimated magnet temperature; and
      when the rotor is no longer stationary, to control an operation of the electric machine using the estimated magnet temperature.

12. The electric powertrain of claim 11, wherein the controller is configured to extract the high-frequency component of the resulting current using a band pass filter.

13. The electric powertrain of claim 12, wherein the position sensor is a resolver, and wherein the controller is configured to execute a resolver offset learning process when the rotor is stationary.

14. The electric powertrain of claim 11, wherein the controller is configured to:
   receive a torque command for the electric machine;
   convert the torque command into d-axis and q-axis current commands via the controller; and
   convert the d-axis and q-axis current commands into d-axis and q-axis voltage commands prior to injecting the high-frequency voltage component, wherein the d-axis and q-axis voltage commands form the control voltage.

15. The electric powertrain of claim 11, wherein the high-frequency voltage component has a calibrated amplitude and a calibrated frequency, and is a square wave or a sinusoidal wave.

16. The electric powertrain of claim 15, wherein the calibrated amplitude is in a range of 20V to 50V and the calibrated frequency is in a range of 500Hz to 2kHz.

17. The electric powertrain of claim 11, wherein the PIM has a switching frequency, and wherein the calibrated frequency of the high-frequency voltage component is less than half of the switching frequency of the PIM.

18. The electric powertrain of claim 11, wherein the load is a road wheel of a motor vehicle, the rotor is connected to the road wheel, and the operation of the electric machine includes delivering motor torque to the road wheel via the rotor.

19. The electric powertrain of claim 11, wherein the operation of the electric machine includes diagnosing a condition of the electric machine.

20. The electric powertrain if claim 11, wherein the operation of the electric machine includes regulating a temperature of the electric machine.

\* \* \* \* \*